F. SINGER.
COMBINATION TOOL.
APPLICATION FILED APR. 24, 1915.
1,225,723.
Patented May 8, 1917.
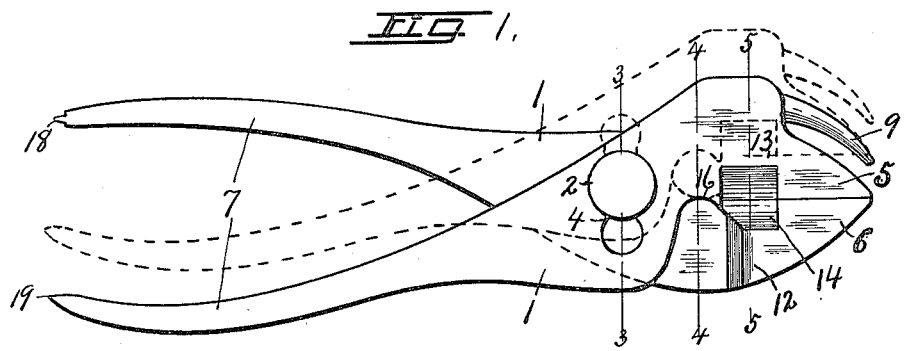
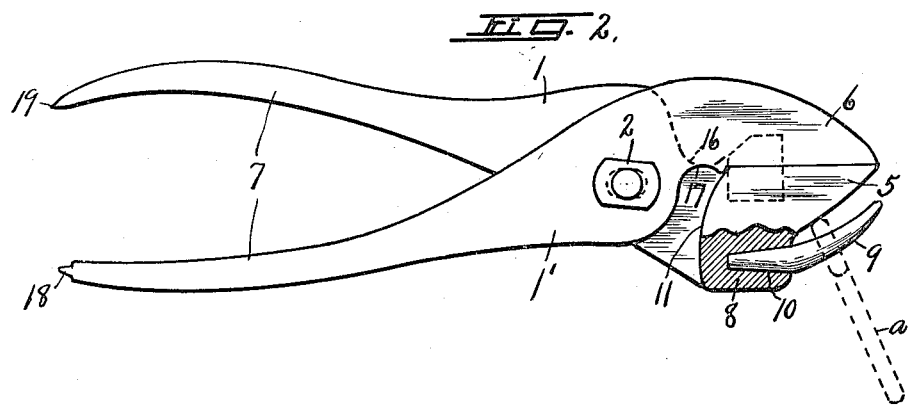
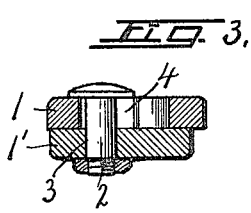
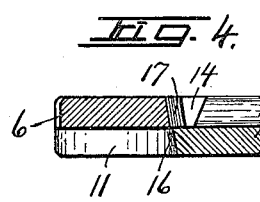
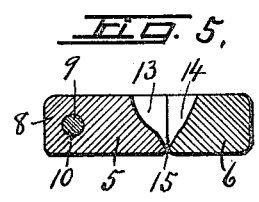
WITNESSES:
INVENTOR
Frank Singer
BY
ATTORNEY.

UNITED STATES PATENT OFFICE.

FRANK SINGER, OF SYRACUSE, NEW YORK, ASSIGNOR TO SYRACUSE TWIST DRILL COMPANY, OF SYRACUSE, NEW YORK, A CORPORATION OF NEW YORK.

COMBINATION-TOOL.

1,225,723.      Specification of Letters Patent.      Patented May 8, 1917.

Application filed April 24, 1915. Serial No. 23,577.

*To all whom it may concern:*

Be it known that I, FRANK SINGER, a citizen of the United States, and a resident of Syracuse, in the county of Onondaga, in the State of New York, have invented new and useful Improvements in Combination-Tools, of which the following, taken in connection with the accompanying drawings, is a full, clear, and exact description.

This invention relates to certain improvements in combination tools, and refers more particularly to the general structure of the jaws, the object being to increase the range of usefulness of devices of this character so that they may be used to perform the work of several tools and in a more convenient and efficient manner without adding materially to the cost of manufacture.

One of the specific objects is to provide the implement with an auxiliary jaw or prying device for removing cotter pins and similar objects.

Another specific object is to provide the jaws with separate sets of coöperative cutters, those of one set shearing with each other, while those of the other set serve as side nippers for trimming purposes, such as cutting wires and similar articles close to other objects.

Other objects and uses will be brought out in the following description.

In the drawings—

Figures 1 and 2 are opposite face views of pliers embodying the various features of my invention, a portion of one of the jaws in Fig. 1 being shown in section.

Figs. 3, 4 and 5 are transverse sectional views of the same device taken, respectively, on lines 3—3, 4—4, and 5—5, Fig. 1.

As illustrated, this combination pliers comprises a pair of levers —1— and —1'—, preferably of steel forging, intersecting or crossing each other intermediate their ends and preferably nearer one end and pivotally connected to turn one upon the other by a pivotal bolt —2— passing through registering openings —3— and —4— and secured against turning in the opening —3—, the portion of the pivotal bolt extending through the opening —4— being provided with opposite flattened sides.

The opening —4— is elongated transversely to form a slot having circular ends and a reduced central portion corresponding in width to the adjacent portion of the bolt across its sides so as to permit the levers to be shifted transversely relatively to each other and rocked about different centers corresponding to the spacing of the circular ends of the opening —4—.

The shorter ends of the levers constitute coöperative jaws —5— and —6— of substantially the same transverse thickness from side to side and having the meeting edges of their outer ends substantially flat and adapted to meet in the same plane when closed, the opposite or longer arms constituting handles —7— which are bowed outwardly in opposite directions with their adjacent sides some distance apart.

The overlapping portions of the levers are preferably halved one to the other and are of substantially uniform thickness approximately equal to half the thickness of the jaws so that their meeting faces are disposed in a plane substantially midway between the opposite faces of said jaws.

The heel of the jaw —5— is widened to form a boss —8— having a forwardly projecting and inwardly curved branch or spur —9— tapering toward its free end and spaced apart from the adjacent branch of the jaw —5— to be used in removing cotter keys and for any other purpose to which it may be applied and is preferably made separate and permanently secured in an opening —10— extending rearwardly from the front end face of the boss —8— with its front end terminating in a plane passing through the extreme front edge of the jaws at substantially right angles to the meeting faces when closed. The boss 8 is adapted to engage the device containing the cotter *a* and form a fulcrum for removing the cotter from a support. By making the cotter detachable from the jaw 5 and boss 8, the device is not rendered worthless should a spur 9 become broken; but instead a new spur alone would be all that was required.

The outer edge of the boss —8— is preferably flat and substantially parallel with the gripping face of the jaw —5— to permit it to be used as a hammer and also to form a suitable fulcrum adapted to bear upon any available support when the spur —9— is inserted through the eye of a cotter key as —*a*— in the act of withdrawing the same from a bolt, shaft or other device in which it may be inserted.

The reduction of the thickness of the overlapping portions of the levers form lateral shoulders —11— and —12— on the jaws —5— and —6—, respectively, approximately midway between their flat gripping faces and axis of movement of the levers one upon the other so that the portions of the jaws in front of said shoulders including the boss —8— are of full thickness or substantially twice the thickness of the overlapping portions, except that they are provided in one side with recesses —13— and —14— extending outwardly from their meeting faces part way across the width thereof and the inner walls of said recesses are beveled toward the meeting faces to form knife edges —15— substantially coincident with the opposite face and contacting in the same plane as the meeting edges of the jaws, thus constituting side nippers for cutting wires or other small metal pieces close to other objects if necessary.

The inner edges of the thinner overlapping portions of the levers just at the rear of the shoulders —11— and —12— are provided with oppositely concave shearing edges —16— and —17— which may also be used for cutting wire or similar small articles, said shearing edges being located between the side nippers —15— and pivot —2— and may, therefore, be applied with greater power than the side nippers.

The extreme end of one of the handles —7— is provided with a screw-driving head —18—, while the corresponding end of the other lever is provided with a tapered extremity —19— adapted to be used as a spreader for the arms of the cotter pin or for any other purpose to which it may be applied.

It will be seen from the foregoing description that this device may take the place of a relatively large number of tools commonly used in automobile kits and in other relations, thereby reducing the expense and weight of equipment and at the same time rendering the work performed more efficient by reason of the ease and convenience with which the device may be manipulated for the various purposes.

What I claim is:

A device of the class described including a handle having a head integral therewith, said head being provided with a curved edge and having a boss extending laterally therefrom at a point spaced from the end of said head, said boss being provided with a socket, and a cotter pin removing spur having one end secured in said socket and having its other end curved to lie adjacent and spaced from the curved edge of said head.

In witness whereof I have hereunto set my hand this 13th day of April, 1915.

FRANK SINGER.

Witnesses:
CHAS. A. KENDALL,
CHAS. V. PRUDHON.

Copies of this patent may be obtained for five cents each, by addressing the "Commissioner of Patents, Washington, D. C."